United States Patent
Neiger et al.

(10) Patent No.: US 8,230,203 B2
(45) Date of Patent: Jul. 24, 2012

(54) DETECTING SPIN LOOPS IN A VIRTUAL MACHINE ENVIRONMENT

(75) Inventors: Gilbert Neiger, Portland, OR (US); Randolph L. Campbell, Folsom, CA (US); James B. Crossland, Banks, OR (US); Gideon Gerzon, Zichron Yaakov (IL); Leena K. Puthiyedath, Beaverton, OR (US); Stephen A. Fischer, Gold River, CA (US); Steven M. Bennett, Hillsboro, OR (US); Andrew V. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 11/694,344

(22) Filed: Mar. 30, 2007

(65) Prior Publication Data

US 2009/0077361 A1 Mar. 19, 2009

(51) Int. Cl.
*G06F 9/00* (2006.01)
*G06F 9/455* (2006.01)

(52) U.S. Cl. .......................................... 712/244; 718/1
(58) Field of Classification Search .................. 712/244; 718/1
See application file for complete search history.

(56) References Cited

U.S. PATENT DOCUMENTS

| | | | | |
|---|---|---|---|---|
| 5,440,750 A | * | 8/1995 | Kitai et al. | 712/203 |
| 5,935,249 A | * | 8/1999 | Stern et al. | 726/21 |
| 6,789,156 B1 | * | 9/2004 | Waldspurger | 711/6 |
| 7,594,234 B1 | * | 9/2009 | Dice | 718/108 |
| 7,765,543 B1 | * | 7/2010 | Weissman et al. | 718/1 |
| 2006/0026411 A1 | * | 2/2006 | Yoshida | 712/241 |
| 2006/0161735 A1 | * | 7/2006 | Kiyota et al. | 711/129 |
| 2007/0169002 A1 | * | 7/2007 | Kronlund et al. | 717/130 |

OTHER PUBLICATIONS

Office Action received for Chinese Patent Application No. 200810100386.8, mailed on Sep. 30, 2010, 8 pages of Chinese Office Action including 5 pages of English Translation.
Office Action received for Chinese Patent Application No. 200810100386.8, mailed on May 11, 2011, 7 pages of Chinese Office Action including 4 pages of English Translation.

* cited by examiner

*Primary Examiner* — Keith Vicary
(74) *Attorney, Agent, or Firm* — Trop, Pruner & Hu, P.C.

(57) ABSTRACT

Embodiments of apparatuses, methods, and systems detecting spin loops in a virtual machine environment are disclosed. In one embodiment, an apparatus includes detection logic and virtualization logic. The detection logic is to detect whether a guest is executing a spin loop. The virtualization logic is to transfer control of the apparatus from the guest to a host in response to the detection logic detecting that the guest is executing the spin loop.

10 Claims, 2 Drawing Sheets

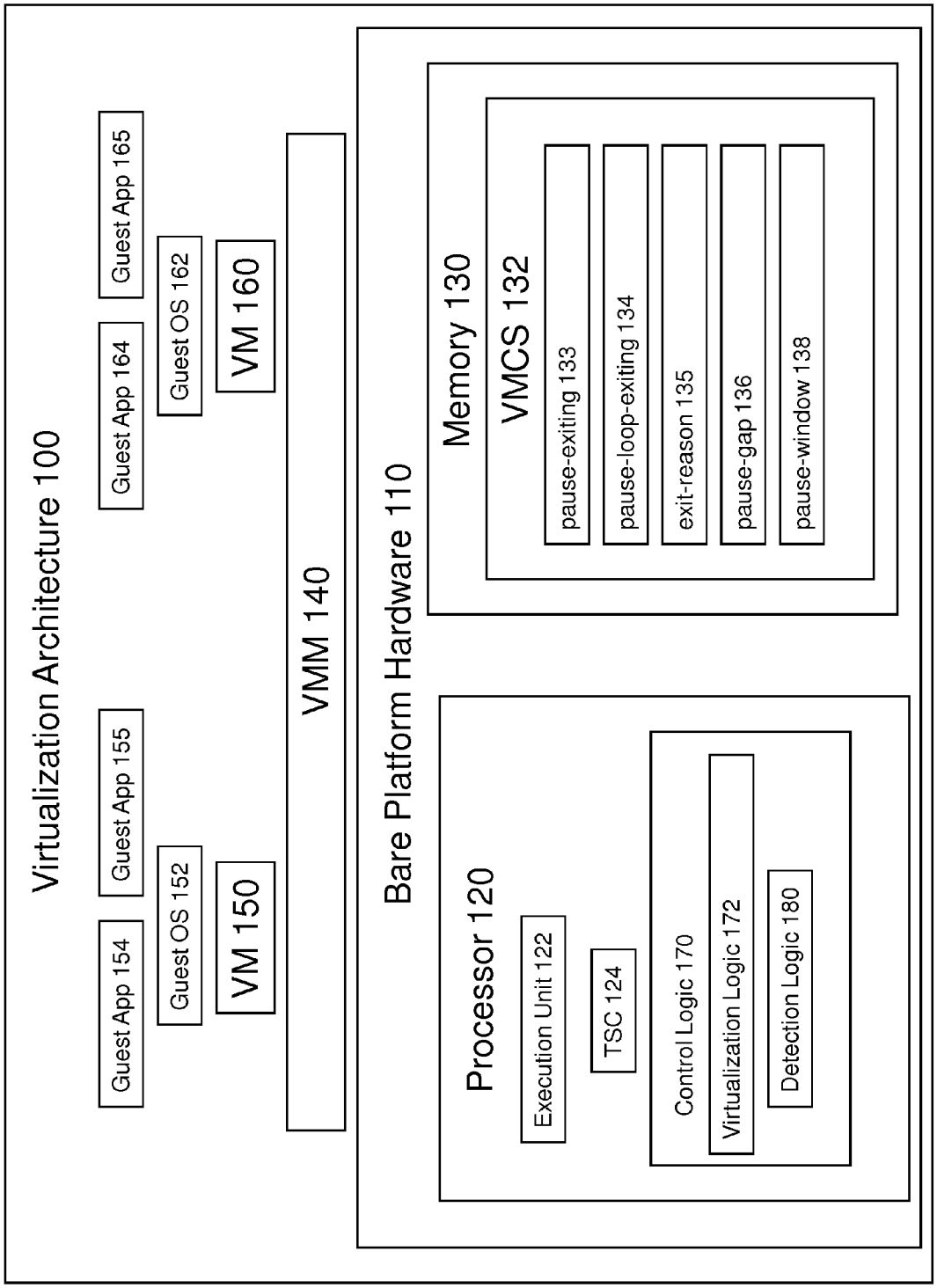

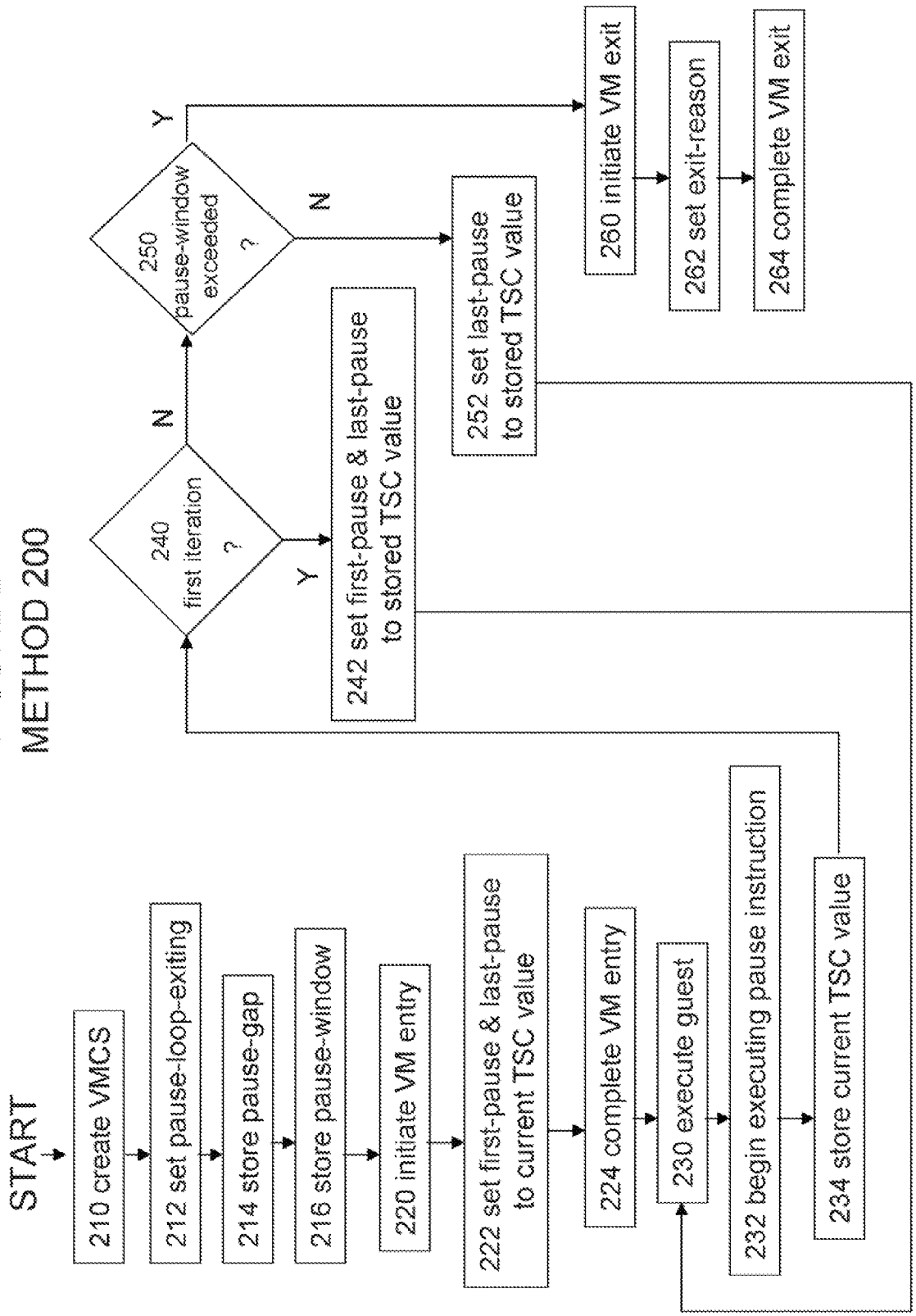

DETECTING SPIN LOOPS IN A VIRTUAL MACHINE ENVIRONMENT

BACKGROUND

1. Field

The present disclosure pertains to the field of information processing, and more particularly, to the field of platform virtualization.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment" or "virtual machine environment"). Each OS, and any other software, that runs on a VM is referred to as a "guest" or as "guest software," while a "host" or "host software" is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies. A physical processor may also support other instructions for maintaining a virtualization environment, and may include memory or register bits that indicate or control virtualization capabilities of the physical processor.

A physical processor may also support a "pause" instruction to insert a delay into an instruction stream. A pause instruction may be used in a spin loop, to slow down the execution of the loop to save power and/or to prevent the processor from filling a different load buffer with the same variable each time the loop is executed. A processor may be designed to detect the execution of a pause instruction by a virtual machine and to cause the processor to exit that virtual machine and enter a different virtual machine, based on the assumption that the guest running in the first virtual machine was in a spin loop during which a guest running in the second virtual machine could more efficiently use the processor's resources.

BRIEF DESCRIPTION OF THE FIGURES

The present invention is illustrated by way of example and not limitation in the accompanying figures.

FIG. 1 illustrates an embodiment of the present invention in a virtualization platform.

FIG. 2 illustrates an embodiment of the present invention in a method for detecting spin loops in a virtual machine environment.

DETAILED DESCRIPTION

The present invention may be embodied in an apparatus, a method, or a system for detecting spin loops in a virtual machine environment, as described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention provide for the detection of spin loops to be used to improve the performance of an information processing system supporting virtualization. A VMM may time-share a processor by switching out of a first virtual machine and into a second virtual machine when the guest in the first virtual machine is idle, such as during a spin loop. As described in the description of related art, a VM switch may be made when a guest, executes a pause instruction, based on the assumption that the guest is in a spin loop. However, a pause instruction may also be used outside of a spin loop, such as to insert a delay to wait for an input/output ("I/O") operation to be completed. When a pause instruction is used outside of a spin loop by a guest, performance may be improved by allowing that guest to continue using the processor, instead of taking the time to save that guest's state and load another guest's state and perform a VM switch. Therefore, embodiments of the present invention provide a novel approach to detecting spin loops.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

FIG. 1 illustrates an embodiment of the present invention in virtualization architecture 100. In FIG. 1, bare platform hardware 110 may be any data processing apparatus capable of executing any OS, VMM, or other such software. For example, bare platform hardware may be that of a personal computer, mainframe computer, portable computer, handheld device, set-top box, server, or any other computing system. Bare platform hardware 110 includes processor 120 and memory 130.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare platform hardware 110 may include any number of processors, including any number of multicore processors, each with any number of execution cores, and any number of multithreaded processors, each with any number of threads.

Memory 130 may be static or dynamic random access memory, semiconductor-based read-only or flash memory, magnetic or optical disk memory, any other type of medium readable by processor 120, or any combination of such mediums. Processor 120 and memory 130 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150 and 160, guest operating systems 152 and 162, and guest applications 154, 155, 164, and 165.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed on VM 150 and guest OS 162 and guest applications 164 and 165 installed on VM 160. Although FIG. 1 shows only two VMs and two applications per VM, any number of VMs may be created, and any number of applications may ran on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need, to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "virtualization events" herein. Some of these virtualization events are referred to as "privileged events" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of, processor 120. When a privileged event occurs or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, and any other such information. Processor 120 reads information from VMCS 132 to determine the execution environment of a VM and constrain its behavior. In this embodiment, VMCS 132 is stored in memory 130. In some embodiments, multiple VMCSs are used to support multiple VMs. Although FIG. 1 shows VMCS 132 stored in memory 130, storing a VMCS in a memory may not be required by the present invention.

Processor 120 may include execution unit 122 to execute instructions, including a pause instruction. A pause instruction may be any instruction to insert a delay into an instruction stream. Processor 120 also includes time stamp counter ("TSC") 124 to count processor clock cycles, or otherwise measure the passage of time. In other embodiments, other approaches to measure the passage of time may be used.

Additionally, processor 120 includes control logic 170 to support virtualization. Control logic 170 may include microcode, programmable logic, hard-coded logic, or any other form of control logic within processor 120. In other embodiments, control logic 170 may be implemented in any form of hardware, software, or firmware, such as a processor abstraction layer, within a processor or within any component, accessible or medium readable by a processor, such as memory 130.

Control logic 170 causes processor 120 to execute method embodiments of the present invention, such as the method embodiments illustrated in below in FIG. 2, for example, by causing processor 120 to include the execution of one or more micro-operations, e.g., to support virtualization, in its response to virtualization instructions or other instructions from a host or guest. For example, the operation of detection logic 180 and the detection of spin loops, as described below in the description of method 200, may be implemented in microcode executed in response to the pause instruction.

Control logic 170 includes virtualization logic 172 and detection logic 180. Virtualization logic 172 is to prepare for and perform VM entries and exits. Detection logic 180 is to detect the execution of spin loops by detecting a spin loop signature, as described below in the description of method 200. Each of these logic units may also perform additional functions, including those described as being performed by another of the logic units, and any or all of these logic units may be integrated into a single logic unit.

In one embodiment, detection logic 180 may track two values, first-pause and last-pause, to assist in the detection of spin loops. These values may be stored storage locations within detection logic 180, within memory 130, or in any other storage locations accessible to processor 120. The value of first-pause is maintained to indicate the TSC value at first time a first pause instruction in a spin loop is executed. The value of last-pause is maintained to indicate the TSC value the most recent time a pause instruction in the same spin loop is executed. The tracking and maintenance of these values is described below in the description of method 200.

Control logic 170 may check or otherwise refer to fields, indicators, bits, or other data structures within VMCS 132 to determine how to manage a VM environment. For example, pause-exiting control bit 133 may be set to cause a VM exit if a guest executes a pause instruction. In this description of this embodiment, control bits are set to enable or cause a desired effect, where set means writing a logical one to the bit, but any logic convention or nomenclature may be used within the scope of the present invention.

Also in VMCS 132, pause-loop-exiting control bit 134 may be set to cause a VM exit if detection logic 180 detects a spin loop being executed by a guest. Pause-exiting control bit 133 may be ignored when pause-loop-exiting control bit 134 is set, to allow the novel approach of the present invention to override the prior approach of causing a VM exit in response to every pause instruction executed by a guest. Also, if desired, detection logic 180 may be disabled when pause-loop-exiting control bit 134 is not set and/or when processor 120 is running outside of a virtual machine environment.

Pause-gap field 136 may be used to store a value that represents a time period, as measured by TSC 124, within which one iteration of a spin loop would typically be executed. Pause-window field 138 may be used to store a value that represents a time period, as measured by TSC 124, that a guest is to be allowed to execute a spin loop before a VM exit occurs.

VMCS 132 may also include fields to store information regarding VM exits, to help the VMM determine the appropriate actions to take when it receives control after a VM exit. For example, VMCS 132 includes exit-reason field 135 to indicate the reason for a VM exit.

FIG. 2 illustrates an embodiment of the present invention in method 200, a method for detecting spin loops in a virtual machine environment. Although method embodiments are not limited in this respect, reference is made to information processing system 100 of FIG. 1 to describe the method embodiment of FIG. 2.

In box 210 of FIG. 2, a VMM (e.g., VMM 140) creates a VMCS (e.g., VMCS 132) for a VM (e.g., VM 150). In box 212, VMM 140 sets pause-loop-exiting control bit 134 so as to cause a VM exit from VM 150 if detection logic 180 detects a spin loop. In box 214, VMM 140 stores a pause-gap value, as described above, in pause-gap field 136. In box 216, VMM 140 stores a pause-window value, as described above, in pause-window field 138.

In box 220, a transfer of control of processor 120 from the host (i.e., VMM 140) to a guest is initiated. The transfer of control, or VM entry, may include virtualization logic 172 causing processor 120 to execute operations or micro-operations to save the host state and load the guest state. In box 222, the values of first-pause and last-pause are set to the TSC value at the time of the VM entry. In box 224, the VM entry is completed.

In box 230, the guest begins or continues to execute instructions. In box 232, the execution of a pause instruction is initiated. In box 234, the current TSC value is stored.

In box 240, it is determined whether the difference between the TSC value from box 234 and the value of last-pause is greater than the value of pause-gap. If so, as should be the case for the first iteration of a spin loop and for a pause instruction outside of a spin loop, then, in box 242, the TSC value from box 234 is stored in first-pause and last-pause, and method 200 returns to box 230. If not, as should be the case for a subsequent iteration of a spin loop, then, in box 250, it is determined whether the difference between the TSC value from 234 and the value of first-pause is greater than the value of pause-window.

If the result of the determination in box 250 is negative, as should be the case if the guest has not been executing a spin loop longer than allowed, then, in box 252, the TSC value from box 234 is stored in last-pause, and method 200 returns to box 230. If the result of the determination in box 250 is positive, as should be the case if the guest has been executing a spin loop longer than allowed, then method 200 continues in box 260.

In box 260, a transfer of control of processor 120 from the guest to the host is initiated. The transfer of control, or VM exit, may include virtualization logic 172 causing processor 120 to execute operations or micro-operations to save the guest state and load the host state. In box 262, virtualization logic 172 stores a value representing the execution of a pause instruction, or any other desired value, such as a value representing detection of a spin loop, in exit-reason field 135. In box 264, the VM exit is completed.

Within the scope of the present invention, the method illustrated in FIG. 2 may be performed in a different order, with illustrated boxes omitted, with additional boxes added, or with a combination of reordered, omitted, or additional boxes.

Furthermore, other approaches to detecting spin loops based on other spin loop signatures are possible within the scope of the present invention. In an instruction-pointer-based embodiment, the instruction pointer associated with a pause instruction may be stored, and then compared to the instruction pointer associated with a subsequent pause instruction, to determine whether the instruction pointers are the same, which would indicate that a pause loop is being executed. In a control-flow-based embodiment, certain transitions in guest execution, such as a privilege level or address space change, or a change in the instruction pointer greater than a certain value, may indicate that a pause loop is not being executed. In a frequency-based embodiment, the number of pause instructions within a specified time period could be counted, and if the number exceeds a certain value, which may be as low as one (i.e., two pause instructions executed within the time period), it may indicate that a spin loop is being executed, or is being executed for a longer time than allowed.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for detecting spin loops in a virtual machine environment have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a hardware execution unit to execute a pause instruction;
a time stamp counter to measure a current time the pause instruction is executed;
detection logic to track a first value and a second value, the first value to indicate a first time the pause instruction is executed within a spin loop of a guest, the second value to indicate a most recent time the pause instruction is executed, and to detect whether the guest is in the spin loop based on a comparison of the difference between the current time and the second value to a threshold value and based on a comparison of instruction pointers for two pause instructions; and
virtualization logic to transfer control of the apparatus from the guest to a host in response to the detection logic detecting that the guest is executing the spin loop and that the difference between the current time and the first value exceeds a window value.

2. The apparatus of claim 1 wherein the detection logic is also to detect whether the guest is executing the spin loop based on a control flow change.

3. The apparatus of claim 1, wherein the detection logic is also to detect whether the guest is executing the spin loop based on a count of pause instructions within a time period.

4. A method comprising:
tracking a first value and a second value, the first value to indicate a first time a processor executes a pause instruction within a spin loop of a guest, the second value to indicate a most recent time the processor executes the pause instruction;
detecting whether the guest is executing the spin loop based on a comparison of the difference between a current time and the second value to a threshold value and based on comparing instruction pointers for two pause instructions; and
transferring control of the processor from the guest to a host in response to determining that the guest is executing the spin loop and that the difference between the current time and the first value exceeds a window value.

5. The method of claim 4, wherein detecting whether the guest is executing the spin loop includes detecting a control flow change.

6. The method of claim 4, wherein detecting whether the guest is executing the spin loop includes counting a number of pause instructions within a time period.

7. A system comprising:
a processor including
a time stamp counter to measure a current time a pause instruction is executed;
detection logic to track a first value and a second value, the first value to indicate a first time the pause instruction is executed within a spin loop of a guest, the second value to indicate a most recent time the pause instruction is executed, to detect whether the guest is in the spin loop based on a comparison of the difference between the current time and the second value to a threshold value and based on a comparison of instruction pointers for two pause instructions; and
virtualization logic to transfer control of the processor from the guest on a virtual machine to a host in response to the detection logic detecting that the guest is executing the spin loop and that the difference between the current time and the first value exceeds a window value; and
a hardware memory to store a data structure to control the virtual machine.

8. The system of claim 7, wherein the memory is to store the threshold value.

9. The system of claim 7, wherein the memory is to store the window value.

10. The system of claim 7, wherein the detection logic is also to detect whether the guest is executing the spin loop based on a spin loop signature.

* * * * *